Figures 4, 5:
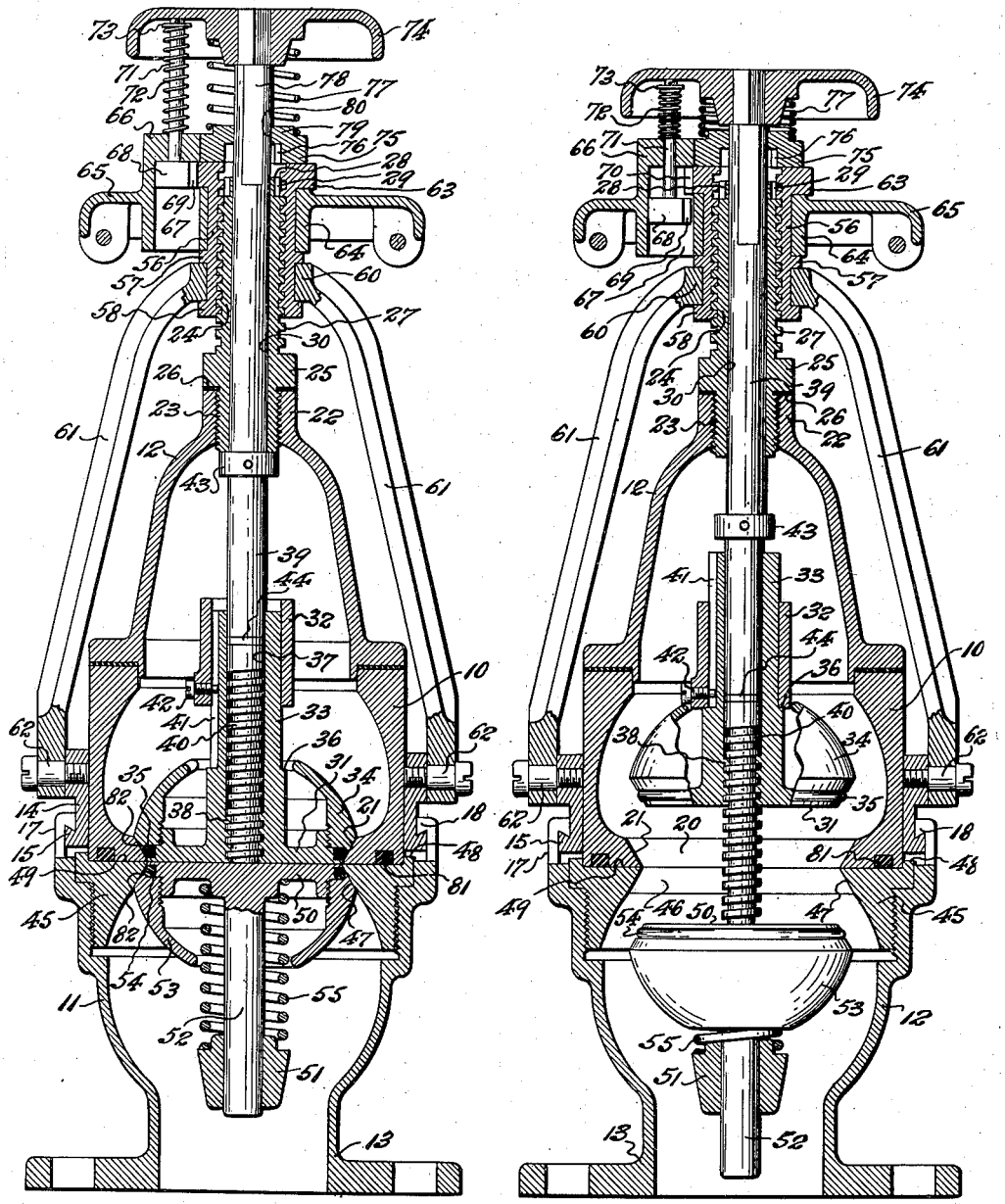

Feb. 22, 1949. H. C. KRONE ET AL 2,462,512
VALVED COUPLING FOR FLUID CONDUCTING LINES
Filed May 8, 1947 2 Sheets-Sheet 1

INVENTORS:
Howard C. Krone & William Meyer,
BY George D. Richards
Attorney

Feb. 22, 1949.   H. C. KRONE ET AL   2,462,512
VALVED COUPLING FOR FLUID CONDUCTING LINES
Filed May 8, 1947   2 Sheets-Sheet 2
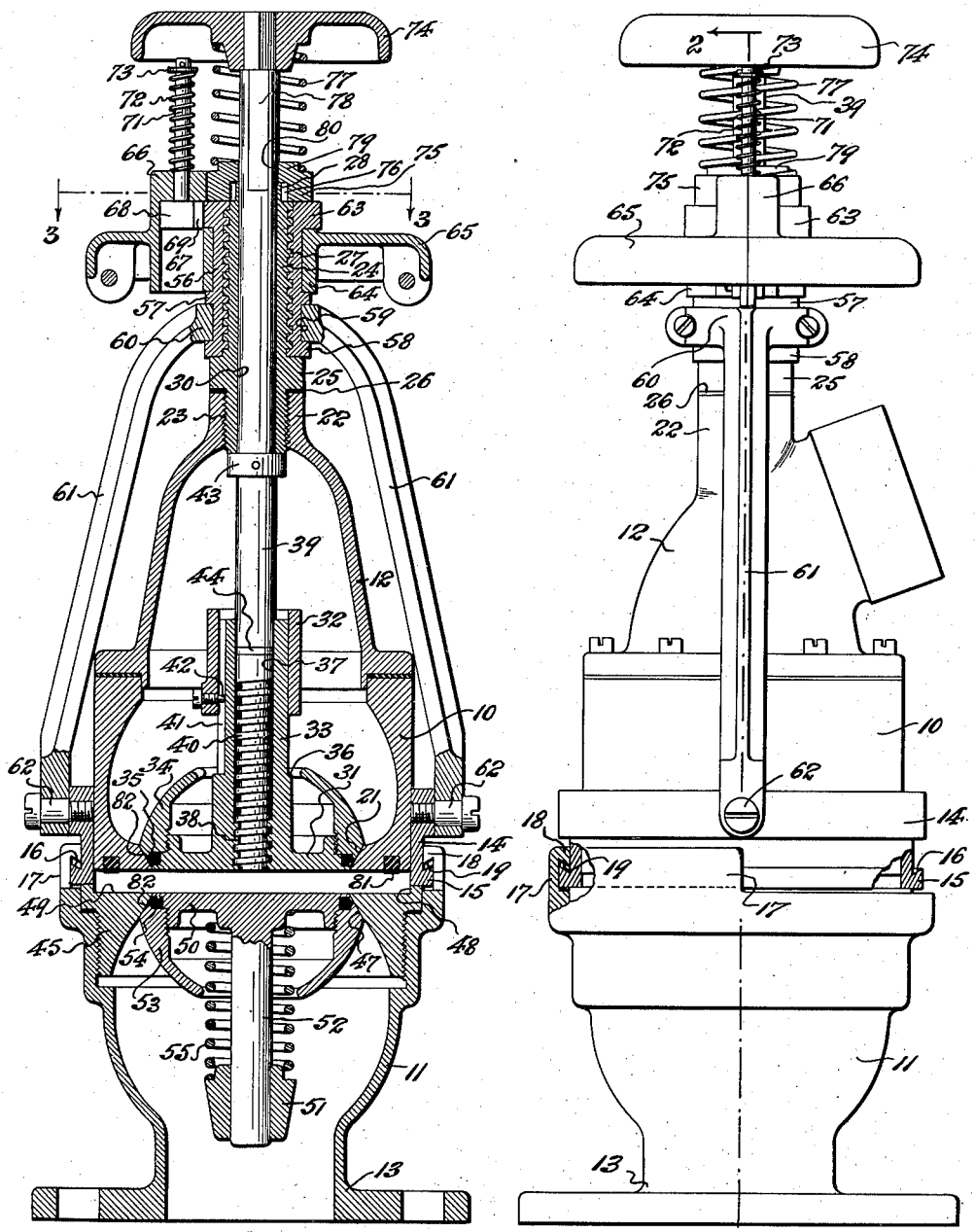
Fig.2
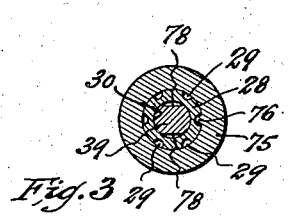
Fig.3
Fig.1
INVENTORS:
Howard C. Krone & William Meyer,
BY George D. Richards,
Attorney Patented Feb. 22, 1949

2,462,512

UNITED STATES PATENT OFFICE 2,462,512

VALVED COUPLING FOR FLUID CONDUCTING LINES

Howard C. Krone, River Edge, and William Meyer, East Orange, N. J., assignors to Wheaton Brass Works, Newark, N. J., a corporation of New Jersey Application May 8, 1947, Serial No. 746,744

8 Claims. (Cl. 306—18)

This invention relates to improvements in valved couplings for fluid conducting lines and the like.

The invention has for an object to provide a novel construction of coupling for fluid conducting lines comprising separable cooperative coupling members which are self-sealing when mutually connected in operative coupled relation, novel manipulatable means being provided for locking the coupling members in coupled together relation, each coupling member having a movable valve element for normally closing the same, and manipulatable means being provided for opening and closing said valve elements, said latter means being so combined with and related to the means for connecting and disconnecting the coupling members that said valve elements cannot, on the one hand, be opened until the coupling members are coupled and sealed together, nor, on the other hand, can the coupling members be released and disconnected until after the valve elements have been closed.

This invention has for further objects to provide in combination with the novel construction of cooperative valved coupling members of manipulatable means by which quick and positive coupling and uncoupling of said members can be accomplished, and wherein the manipulatable valve elements of the coupling members may be easily actuated against fluid pressure, all without risk of spurting or other leakage.

Other objects of this invention, not at this time more particularly enumerated, will be understood from the following detailed description of the same.

An illustrative embodiment of the invention is shown in the accompanying drawings, in which—

Fig. 1 is a side elevational view, with parts in section, of the separable coupling members of the coupling as brought together in aligned relation, but before the same are relatively moved to operative connected and sealed relation; Fig. 2 is a longitudinal sectional view of the coupling, as thus conditioned, taken on line 2—2 in Fig. 1; and Fig. 3 is a fragmentary horizontal sectional view, taken on line 3—3 in Fig. 2, and showing the means for locking the valves of the coupling members against manipulation.

Fig. 4 is a longitudinal sectional view, similar to that of Fig. 2, but showing the coupling members relatively moved to operative connected and sealed relation, and the valve manipulating means as thereupon released subject to actuation; and Fig. 5 is a like longitudinal sectional view, but showing the valves of the coupling members moved to open condition by actuation of the manipulating means provided for such purpose.

Similar characters of reference are employed in the above described views, to indicate corresponding parts.

Referring to the drawings, the novel valved coupling structure according to this invention comprises a male coupling member 10 and a female coupling member 11. The male coupling member 10 is provided with a laterally offset neck portion 12 for attachment to a pipe, hose or other part through which fluid may flow to or from the same. The female coupling member 11 is also provided with a neck portion 13 for attachment to a hydrant, pipe, hose or other part through which fluid may flow to or from the same.

The male coupling member 10 is preferably of external cylindrical shape. Mounted on the exterior of said male coupling member 10, subject to axial slidable movement thereon, is a coupler sleeve 14. Said coupler sleeve 14 is provided, at its outer end, with an external annular coupler flange 15 which is preferably formed to provide an inwardly and downwardly beveled male coupler shoulder 16.

The female coupling member 11 is provided as an integral part thereof, with a laterally open semi-cylindrical coupler section 17. Said coupler section 17 is provided at its free end with an internal coupler flange 18 which is preferably formed to provide an inwardly and upwardly beveled female coupler shoulder 19.

Formed in the outer end of the male coupling member 10 is a valve port 20 surrounded by a valve seat 21. Formed in connection with the neck portion 12 of said male coupling member 10 is an internally screw-threaded boss 22 which is disposed in axially aligned relation to said valve port 20. Threaded into said boss 22 is the externally screw-threaded nipple end 23 of an external, upwardly extending locking stem 24. Said locking stem 24 is provided, intermediate its main body and said nipple end 23, with an annular collar flange 25, which seats against the outer end of the boss 22. Interposed between said boss 22 and collar flange 25 is a sealing washer 26, for sealing the joint between said locking stem 24 and the neck portion 12 of said male coupling member. Said locking stem 24 is provided with external left hand screw-threads 27 of suitable pitch. At its extremity, said locking stem 24 is provided with a male locking key portion 28, which is formed to provide a plurality of circumferentially spaced, longitudinal lock channels or grooves 29 for purposes to be subsequently herein explained. Said locking stem 24 is provided with an axial bore 30.

Cooperative with the valve port 20 of said male coupling member 10, to normally seat upon the valve seat 21 so as to close said valve port, is the valve member 31 of said male coupling member. Extending axially upward from said valve member 31, so as to be slidably guided in a valve guide means 32, which is suitably fixed and supported within the interior of the male coupling member 10, is the shank 33 of said valve member 31. Supported in connection with the periphery of said valve member 31, and held in operative assembled relation thereto by a retainer member 34 which is threaded onto said valve member, is a seal ring 35 of suitable resilient material. When the valve member 31 is disposed to close the valve port 20, said seal ring 35 bears upon and is compressed against the valve seat 21, whereby to seal the joint between the valve member and said seat against leakage. Said valve shank 33 is formed to provide an annular stop shoulder 36 at a suitable point intermediate its upper end portion and said valve member 31. The upper end portion of the valve shank 33 slidably rides in the valve guide means 32. Said valve shank 33 is provided with an axial bore 37, the lower portion of which is formed to provide internal screw-threads 38. Axially movable through the bore 30 of the locking stem 24 is a valve actuating stem 39, the lower or inner end portion of which is provided with external right-hand screw-threads 40 of suitable pitch. Said valve actuating stem 39 extends into the bore 37 of the valve shank 33, so that its screw-threads 40 operatively engage the internal screw-threads 38 of said shank. Said valve member 31 and its shank 33 must be retained against rotation about its axis while nevertheless free for axial movement. To such end, the upper portion of the valve shank 33, which slides in the valve guide means 32, is provided with an external longitudinal spline channel or groove 41 which is engaged by the end of a stop screw 42 which is supported in and by the valve guide means 32. The upward movement of the valve actuating stem 39 is limited by a stop collar 43 which is suitably fixed thereon, and is adapted to abut the nipple end 23 of the locking stem 24. In order to seal the joint intermediate the valve actuating stem 39 and the bore 37 of the valve shank 33, said valve actuating stem 39 is provided with a suitably located packing or sealing ring 44.

The female coupling member 11 is provided with a valve seat member 45, which is threaded into the upper open end portion thereof, and which is formed to provide said female coupling member with a valve port 46 surrounded by a valve seat 47. Said valve seat member 45 is disposed below the semi-cylindrical coupler section 17 of said female coupling member 11. Said valve seat member 45 is preferably provided in connection with its outer face with an upstanding annular flange 48, the internal diameter of which corresponds to the external diameter of the male coupling member 10, and thus forms a shallow receiving socket 49 for the reception of the end of the latter, when said coupling members 10 and 11 are joined and interlocked together in operative connected or coupled relation.

Cooperative with the valve port 46 of the female coupling member 11, to normally seat upon said valve seat 47 so as to close said valve port, is the valve member 50 of said female coupling member. Extending axially downward from valve member 50, so as to be slidably guided in a valve guide means 51 which is suitably fixed and supported within the interior of the female coupling member 11, is the shank 52 of said valve member. Supported in connection with the periphery of said valve member 50, and held in operative assembled relation thereto by a retainer member 53 which is threaded onto said valve member, is a seal ring 54 of suitable resilient material. When said valve member 50 is disposed to close the valve port 46, said seal ring 54 bears upon and is compressed against the valve seat 47, whereby to seal the joint between the valve member and said seat against leakage. Said valve member 50 is yieldably urged to seated relation to the valve seat 47, and thus to close the port 46, by a compression spring 55 which is mounted around the shank 52 between said valve member 50 and the valve guide means 51.

Mounted to both turn and move axially upon the locking stem 24 is an internally screw-threaded locking collar 56, the threads of which engage the threads 27 of said locking stem. At its lower end, said locking collar 56 is provided with axially spaced annular flanges 57 and 58, which are adapted to provide an intermediate seat 59 in which is engaged the coupling yoke portion 60 of a pair of oppositely and downwardly extending draft arms 61; all in such manner that said locking collar 56 is in swiveled coupled relation to said yoke portion and its draft arms. The free end portions of said draft arms 61 are respectively pivotally connected, by pivoting studs 62, to opposite sides of the coupler sleeve 16 with which the male coupling member 10 is provided. The upper end of said locking collar 56 terminates in a diametrically enlarged head 63. Mounted on the upper end of said locking collar 56, intermediate the head 63 and the upper annular flange 57 thereof, is the hub 64 of a coupling hand wheel 65. Formed in connection with said coupling hand wheel is a housing portion 66, within the interior chamber 67 of which is housed a movable latch bolt 68. Said bolt 68 is provided with a laterally projecting latch nose 69 which normally engages in a receiving socket 70 which is formed in the periphery of the head 63 of said locking collar 56, whereby to normally interlock said coupling hand wheel 65 and locking collar 56 together, so that manually induced rotation of the former will rotate the latter. Said latch bolt 68 is provided with a perpendicularly extending push-piece 71 which projects upwardly through the top wall of the housing portion 66 to project exteriorly upward therefrom. Said latch bolt 68 is yieldably raised to normal interlocked relation to the locking collar head 63 by a compression spring 72 which is mounted around said push-piece 71 between the housing portion 66 and a stop washer 73 which is affixed to the free end of said push-piece 71.

The valve actuating stem 39 projects freely upward beyond the locking collar 56, and affixed to its exterior end is a valve operating hand wheel 74. Slidably but non-rotatably mounted on the exterior end portion of the valve actuating stem 39 is a female locking key 75, which is provided with an internal key tongue 76 adapted to normally engage in a lock channel or groove 29 of the male locking key portion 28 on the locking stem 24. A compression spring 77 is interposed between the valve operating hand wheel 74 and the female locking key 75, whereby to yieldably urge the latter toward and for cooperation with said male locking key portion 28. The valve actuating stem 39 is provided with milled flats 78, and the hub 79 of the female locking key 75 is broached to provide an opening 80 to conform to said milled flats of the valve actuating stem, whereby said female locking key can slide axially relative to the valve actuating stem, but is incapable of rotation thereon.

Provided in the end face of the male coupling member 10 is a sealing gasket 81 of suitable resilient material, which is adapted to contact and seal against the end face of the valve seat member 45 of the female coupling member 11, when said coupling members 10 and 11 are operatively connected together in coupled relation.

When the male and female coupling members 10 and 11 are disconnected or uncoupled, the locking collar 56 occupies a normal downwardly moved position on the locking stem 24, so that the coupling yoke 60 and its draft arms 61 occupy a normal initial lowered position, whereby to downwardly project the coupler flange 15 of the coupler sleeve 14 of the male coupling member 10 beyond the plane of the end of the latter (see Figs. 1 and 2). Under such conditions, the coupling hand wheel 65 is locked to the locking collar 56 by the latch bolt 68, and, at the same time, the female locking key 75 is disposed to interlock with the male locking key portion 28 of the locking stem 24, thus preventing turning of the valve actuating stem 39, and consequently preventing opening of the valve member 31 of the male coupling member 10, while the male and female coupling members 10 and 11 remain uncoupled (again see Figs. 1 and 2).

In the use and operation of the coupling, to initially engage the male and female coupling members 10 and 11 together, preparatory to locking them up in cooperative coupled and sealed relation, the lowered coupler sleeve 14, which is carried by the male coupling member 10, is moved sidewise through the open side of the coupler section 17 of the female coupling member 11, thus bringing the coupling members 10 and 11 into axially aligned relation, and at the same time disposing the coupler flange 15 of said coupler sleeve 14 beneath the coupler flange 18 of the coupler section 17 (see Fig. 2).

After the male and female coupling members 10 and 11 have been initially disposed in axially aligned relation as above described, the same are relatively moved to cooperative coupled and sealed relation as follows:

The coupling hand wheel 65 is manually turned in clockwise direction, thus turning the locking collar 56 in like direction, whereby the same is caused, by reason of its screw-threaded relation to the locking stem 24, to move upwardly along the latter. Such upward movement of the locking collar 56 exerts an upward pull upon the coupling yoke portion 60 and its draft arms 61, which movement is communicated through the latter to the coupler sleeve 14. The upward movement thus imparted to the coupler sleeve 14 first brings its coupler flange 15 into engagement with the coupler flange 18 of the coupler section 17 of the female coupling member 11. Continued upward movement of the coupler sleeve 14 relative to the male coupling member 10 draws the same and the female coupling member 11 together, so that the end of said male coupling member enters the receiving socket 49 of the valve seat member 45 of the female coupling member 11, thereby abutting these parts, and sealing the joint therebetween by compression of the sealing gasket 81 which lies therebetween (see Fig. 4). When the male and female coupling members 10 and 11 are thus cooperatively coupled and sealed together, their respective valve members 31 and 50 will be disposed in face to face abutment, but still in closed relation to the respective valve ports served thereby (again see Fig. 4).

The rising movement of the locking collar 56, which effects the coupling and sealing together of the male and female coupling members 10 and 11, is communicated to the female locking key 75, which is thus caused to slide upwardly along the valve actuating stem 39 against the tension of the spring 77, so that by the time the coupling and sealing of the coupling members 10 and 11 is completed, said female locking key 75 is carried away and disengaged from the male locking key portion 28 of the locking stem 24, thus freeing the valve actuating stem 39 for manipulation, but only after said coupling members 10 and 11 are secured in cooperative coupled and sealed relation. By reason of this, it will be obvious that the valve members of the coupling members cannot be opened until the latter are brought into coupled and sealed relation, and consequently no spurting or leakage of fluid can occur during the coupling up operations.

The upward movement of the coupling hand wheel 65 carries with it the push-piece 71 of the latch bolt 68, so that the end of said push-piece 71 is brought adjacent to the valve operating hand wheel 74 by the time the coupling members 10 and 11 are cooperatively joined and sealed together, but before the valve members of the latter can be opened (see Fig. 4).

The coupling members 10 and 11 having been joined and sealed together as described, the valve members thereof may thereupon be moved to open condition. To accomplish this, the valve operating hand wheel 74 is manipulated to turn the valve actuating stem 39 in direction to rotate its screw-threaded portion 40 relative to the screw-threaded part 38 of the shank 33 of the valve member 31 within the male coupling member 10. The first effect of such rotation of the valve actuating stem 39 is to cause the valve member 31 to travel upwardly along the rotated valve actuating stem 39, until the shoulder 36, with which its shank 33 is provided, abuts the valve guide means 32, and thus arrests such movement of the valve member 31, whereby to dispose the same in open relation to the valve port 20 of said male coupling member 10 (see Fig. 5). After arrest of the upwardly moved member 31, the threaded portion 38 of its shank 33 operates as a stationary nut relative to which the screw-threaded portion 40 of the valve actuating stem 39 may turn as rotation of said valve actuating stem is continued. Under the latter conditions, the valve actuating stem will be caused to move downward, and since its extremity abuts the valve member 50 of the female coupling member 11, such downward movement of the valve actuating stem 39 will exert a downward thrust upon the valve member 50, whereby to cause the latter to move downward against the tension of its spring 55, whereby to in turn dispose the same in open relation to the valve port 46 of the female coupling member 11 (again see Fig. 5). Both valve members 31 and 50 being thus moved to open positions, the coupling is thereby opened to flow of liquid therethrough.

As the valve actuating stem 39 moves downward to bring the valve members to opened position, the valve operating hand wheel 74, by its accompanying downward movement, exerts a downward thrust upon the push-piece 71 of the latch bolt 68, which is operative to move the latch bolt 68 downwardly relative to the head 63 of the raised locking collar 56, whereby to withdraw the latch nose 69 out of the socket 70 of said head 63 (see Fig. 5). The effect of this is to free the coupling hand wheel 65 from its operative interlocked relation to the locking collar 56, whereby rotation of said coupling hand wheel 65 cannot be communicated to said locking collar 56, and consequently the mechanism operative to join the male and female coupling members 10 and 11 in cooperative coupled and sealed relation cannot be operated with uncoupling effect upon said coupling members 10 and 11 while the valve members 31 and 50 remain open; and not, in fact, until after said valve members have been closed, by reverse manipulation of the valve actuating stem 39, which again permits the latch bolt 68 to engage the locking collar head 63 so as to again operatively connect the coupling hand wheel 65 to said locking collar 56. By reason of this, the valve members 31 and 50 must first be closed before the coupling members 10 and 11 are disconnected, and therefore all risk of spurting or leakage of fluid during disconnecting manipulation of the coupling members is avoided.

It will be understood that, by a reversal of the described coupling and valve opening operations, the valve members 31 and 50 will first be closed, and thereafter the coupling connections can be released and the valve actuating stem again locked by the mating of the male and female locking key means 75—28 under the thrust of the spring 77, whereupon the male and female coupling members 10 and 11 can be disconnected and separated.

It will be noted that each valve member 31 and 50 is provided with a seal ring which is supported in an annular seat with which the valve member is provided, and which is retained against displacement from the seat by a novel retainer member. Each retainer member is characterized by the possession of an annular keeper lip 82 which overhangs the seal ring so as to very effectively secure the latter against displacement from its seat, while nevertheless exposing sufficient external peripheral surface thereof for sealing engagement with a valve seat.

From the above it will be apparent that a very efficient and safe coupling means for separably connecting fluid conducting lines is provided by the present invention, and one which is of such novel construction and mode of operation that all risk of leakage and loss of fluid during coupling and uncoupling operations is avoided. The coupling structure of this invention is therefore especially well adapted for use in lines conducting inflammable fluids, since the safeguards against leakage thereby provided avoids not only loss of fluid but also eliminates fire hazards which would otherwise attend the coupling and uncoupling operations.

Having now described our invention, we claim:

1. A coupling for connecting fluid conducting lines comprising separable coupling members adapted to be aligned end to end, manipulatable means for locking said coupling members together in joined and sealed relation, each coupling member having an axially movable valve for normally closing the same, an axially disposed manipulatable means common to both said valves for opening and closing the same by relatively opposite axial movements, and means for so relating said locking means and said valve actuating means that said valve actuating means cannot be manipulated to open said valves until after the locking means has been operated to couple and seal the coupling members, nor can said locking means be manipulated to release said coupling members until after the valve actuating means has been manipulated to close said valves.

2. A coupling for connecting fluid conducting lines comprising separable coupling members having cooperative coupling means for interengaging the same in end to end axially aligned joined and sealed relation, each coupling member having a movable valve for normally closing the same, one said coupling member having a fixed exteriorly projecting, axially aligned, externally screw-threaded locking stem, an internally screw-threaded locking collar rotatably mounted on said locking stem subject to axial movement thereon, means interconnecting said locking collar with said coupling means whereby to operate the latter, and a valve actuating means extending axially through said locking stem into the coupling interior for cooperation with the valves therein.

3. A coupling for connecting fluid conducting lines comprising separable coupling members having cooperative coupling means for interengaging the same in end to end axially aligned joined and sealed relation, each coupling member having a movable valve for normally closing the same, one said coupling member having a fixed exteriorly projecting, axially aligned, externally screw-threaded locking stem, an internally screw-threaded locking collar rotatably mounted on said locking stem subject to axial movement thereon, means interconnecting said locking collar with said coupling means whereby to operate the latter, a valve actuating means extending axially through said locking stem into the coupling interior for cooperation with the valves therein, and said valve actuating means and said locking stem having cooperative interlocking means adapted to secure the former against valve opening manipulation when the locking collar is in coupling means releasing position, said interlocking means being adapted to be released by the coupling means operating movement of said locking collar.

4. A coupling for connecting fluid conducting lines comprising separable coupling members having cooperative coupling means for interengaging the same in end to end axially aligned joined and sealed relation, each coupling member having a movable valve for normally closing the same, one said coupling member having a fixed exteriorly projecting, axially aligned, externally screw-threaded locking stem, an internally screw-threaded locking collar rotatably mounted on said locking stem subject to axial movement thereon, means interconnecting said locking collar with said coupling means whereby to operate the latter, a valve actuating means extending axially through said locking stem into the coupling interior for cooperation with the valves therein, said valve actuating means and said locking stem having cooperative interlocking means adapted to secure the former against valve opening manipulation when the locking collar is in coupling means releasing position, said interlocking means being adapted to be released by the coupling means operating movement of said locking collar, a hand wheel for rotating said locking collar, and a releasable latch means for normally securing said handwheel in operative relation to said locking collar, said latch means being adapted to be released by valve opening operation of said valve actuating means, whereby to disconnect said handwheel from said locking collar while the valves are open.

5. A coupling of the kind described comprising separable male and female coupling members having cooperative coupling means for interengaging the same in axially aligned sealed relation, an axially movable valve in each coupling member to normally close the same, spring means for yieldably urging the valve of the female coupling member to closed position, the valve of said male coupling member having an axial shank provided with an internally threaded bore, said male coupling member having a fixed exteriorly projecting externally screw-threaded locking stem, said locking stem having an axial bore, a valve actuating stem extending through said locking stem bore, the inner end portion of said valve actuating stem being screw-threaded to engage the internally screw-threaded shank of the male coupling member valve, means to retain said male coupling member valve against rotation but free to be moved axially by operation of said valve actuating stem, means to arrest opening movement of the male coupling member valve, whereafter continued operation of said valve actuating stem exerts opening thrust upon the female coupling member valve, a manipulatable internally screw-threaded locking collar rotatably mounted on said locking stem subject to axial movement thereon, and means interconnecting said locking collar with said coupling means whereby to operate the latter.

6. A coupling of the kind described as defined in claim 5 wherein said valve actuating stem and said locking stem are provided with cooperative interlocking means adapted to secure the former against valve opening manipulation when the locking collar is in coupling means releasing position, said interlocking means being adapted to be released by the coupling means operating movement of said locking collar.

7. A coupling of the kind described as defined in claim 5 wherein said valve actuating stem and said locking stem are provided with cooperative interlocking means adapted to secure the former against valve opening manipulation when the locking collar is in coupling means releasing position, said interlocking means being adapted to be released by the coupling means operating movement of said locking collar, a hand wheel for rotating said locking collar, and a releasable latch means for normally connecting said hand wheel in operating relation to said locking collar, said latch means being adapted to be released by valve opening operation of said valve actuating stem, whereby to disconnect said hand wheel from the locking collar while the valves are open.

8. A coupling of the kind described as defined in claim 5 wherein said valve actuating stem and said locking stem are provided with cooperative interlocking means adapted to secure the former against valve opening manipulation when the locking collar is in coupling means releasing position, said interlocking means being adapted to be released by the coupling means operating movement of said locking collar, a hand wheel for rotating said locking collar, a releasable latch means for normally connecting said hand wheel in operating relation to said locking collar, said latch means being adapted to be released by valve opening operation of said valve actuating stem, whereby to disconnect said hand wheel from the locking collar while the valves are open, a spring retracted push-piece extending upwardly from said latch means, a second hand wheel for operating said valve actuating stem adapted to engage and move said push-piece so as to release said latch means.

HOWARD C. KRONE.
WILLIAM MEYER.

REFERENCES CITED

The following references are of record in the file of this patent:

UNITED STATES PATENTS

| Number | Name | Date |
|---|---|---|
| 2,426,471 | Snyder | Aug. 26, 1947 |